United States Patent [19]
Ayers

[11] Patent Number: 5,110,334
[45] Date of Patent: May 5, 1992

[54] METHOD OF PRODUCING GLASS FIBER WITH CORES OF A DIFFERENT MATERIAL

[75] Inventor: Jack D. Ayers, Oakton, Va.

[73] Assignee: The United States of America as represented by the Secretary of the Navy, Washington, D.C.

[21] Appl. No.: 560,703

[22] Filed: Jul. 31, 1990

[51] Int. Cl.⁵ .................. C03B 37/025; C03B 37/075
[52] U.S. Cl. ........................ 65/2; 29/419.1; 65/3.1; 65/13; 65/18.1
[58] Field of Search ............... 65/2, 13, 3.1, 18.1; 29/419.1

[56] References Cited
U.S. PATENT DOCUMENTS

| | | | |
|---|---|---|---|
| 3,362,803 | 1/1968 | Dannöhl | 65/13 |
| 3,481,013 | 12/1969 | Dannöhl et al. | 29/419.1 X |
| 3,483,072 | 12/1969 | Cox et al. | 65/13 X |
| 3,640,693 | 2/1972 | Galasso et al. | 65/2 |
| 4,163,654 | 8/1979 | Krohn et al. | 65/13 X |
| 4,230,473 | 10/1980 | Miller | 65/18.1 X |
| 4,277,270 | 7/1981 | Krohn | 65/13 X |

Primary Examiner—Robert L. Lindsay
Attorney, Agent, or Firm—Thomas E. McDonnell; Barry A. Edelberg

[57] ABSTRACT

A process is provided for forming a glass fiber having one or more metal filaments in its core. In the process, a metal rod or particles of a metal or semiconducting material optionally mixed with glass powder is introduced into a hollow glass tube closed at one end, and the tube is evacuated while the closed end is heated and a fiber drawn therefrom. The resultant glass fiber contains one or more discrete filaments of the metal or semiconducting material.

24 Claims, 5 Drawing Sheets

METHOD OF PRODUCING GLASS FIBER WITH CORES OF A DIFFERENT MATERIAL

BACKGROUND OF THE INVENTION

1. Field of the Invention

The process of the present invention relates, in general, to a process of producing long glass fibers and, more particularly, to a drawing process in which glass fibers containing cores of metallic or ceramic materials are produced. The metallic or ceramic cores of the glass fiber can be located on or about the axis of the glass fiber.

2. The Prior Art

Glass fibers with metal cores have long been made by variations of the method described in U.S. Pat. No. 1,793,429. Versions of this process, in which long fibers can be made, generally consists of maintaining a small pool of molten metal in the fused tip of a glass tube from which a fiber is drawn. The glass tube is fed at a constant rate into a heated zone, and the molten metal pool is maintained by feeding a wire or rod of the metal into the pool through the open end of the tube. These methods can be used to make fibers having lengths that are limited only by the volume of glass, but these process have several serious shortcomings. Principal among these problems is that the glass-to-metal ratio cannot be accurately controlled because the metal filament diameter depends on the properties of the glass and on several of the processing parameters.

These methods have produced only solid core metallic or ceramic filaments in solid glass fibers. Another type of process employs filling a glass tube with a solid charge of metal or a loose powder. A problem with this approach is that the change in volume of the charge as it melts causes a gap to form between the melt and the unfused charge. This gap causes instability during processing and leads to the production of fibers having nonuniform dimensions.

U.S. Pat. No. 3,640,693 discloses a method for making glass fibers containing a filament of silicon, the method consisting of a two-step process. In the first step, the glass is filled with powdered silicon evacuated and heated to vacuum cast the silicon onto a solid metal core, completely filling the inside diameter of the tube. The resultant silicon-filled tube is then heated without vacuum to the working temperature of the glass, while drawing a fiber therefrom.

It is desirable to have a process in which the tube can be maintained in close contact with the charge at all times in order to maintain uniform temperature gradients along the tube and the charge. Such a process could be used to promote more uniform fiber geometry.

SUMMARY OF THE INVENTION

An improved one-step process is provided for forming glass fibers with metal filaments in the core thereof having more uniform fiber geometry In this process, the tube can be maintained in close contact with the charge. The glass fiber is drawn from a glass tube which contains in its core either a solid metal, or elemental semiconductor or nonceramic semiconducting compound rod or a powder of metal, elemental semiconductor, nonceramic semiconducting compound or ceramic material (semiconducting or not) or a mixture of metal and glass powders. A sufficient vacuum is applied to an open end of the tube to create a pressure differential which causes the heated softened end of the tube to collapse into contact with the solid metal rod or powder charge in the core of the tube, thereby preventing the formation of a gap between the metal charge and the pool of molten metal. The lower end of the tube, which is closed, is heated sufficiently to permit a fiber to be drawn from it. When powders are used, a glass fiber is produced containing in its core one or more discrete filaments of the metal, elemental semiconductor or ceramic material. Glass fibers produced according to the present invention can be used to form a field-emitting device.

BRIEF DESCRIPTION OF THE DRAWINGS

Various other objects, features, and attendant advantages of the present invention will be more fully appreciated as the same becomes better understood when considered in conjunction with the accompanying drawings in which like reference characters designate the same or similar parts throughout the several views, and wherein.

DETAILED DESCRIPTION OF THE PREFERRED EMBODIMENTS

Figure 1A:
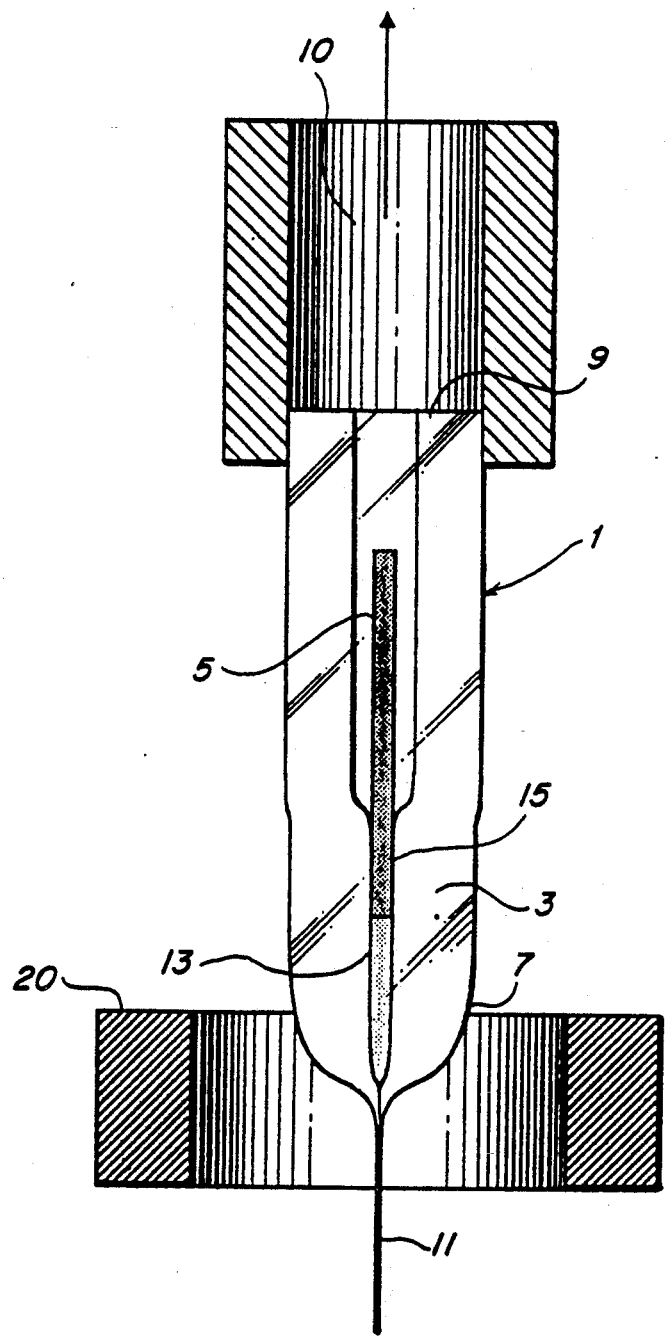
FIG. 1a is an enlarged sectional view of a glass tube containing a metal rod, which combination is drawn at its lower end while the glass tube is evacuated and heated at its closed end.

The process of the present invention makes use of the fact that glasses have a viscosity which varies significantly with temperature, changing by several orders of magnitude over a temperature span of a few hundred degrees. In one preferred embodiment, the process of the present invention makes possible the drawing of fibers using glass tubes and powdered metal, elemental semiconductor or ceramic fillers.

In another preferred embodiment, the process of the present invention consists of partially filling a glass tube that is closed at its lower end with a powdered mixture of glass with metal, ceramic or elemental semiconductor material which melts at a temperature below the working temperature of the glass. This glass tube can then be evacuated through its upper end, lowered into and through a hot zone, and a fiber drawn from its lower closed end. The vacuum is applied to create a pressure differential between the inside and outside of the tube. This pressure differential causes the tube to shrink tightly against the powder in the tube, thus eliminating voids and maintaining the powdered material in contact with molten charge.

Shrinking the glass tubing into close contact with a powdered charge or a wire or rod source of metal, elemental semiconductor, nonceramic semiconducting compound or ceramic (semiconducting or not) provides several advantages during processing. One advantage is that gaps do not form between the pool of molten metal, molten semiconductor (the terms "molten elemental semiconductor" and "molten semiconductor", etc., are defined in the specification and claims as a molten elemental (non-compound) or compound (ceramic or non-ceramic) material which, in the solid state, is a semiconductor. The terms "molten elemental semiconductor" and "molten semiconductor", etc., are not intended to imply that the material is semiconducting in the liquid state. Also, except where otherwise stated, the term "semiconductor" refers to all semiconducting materials, whether ceramic, compound, or elemental) or molten ceramic and the powdered metal, semiconductor or ceramic material or solid metal or elemental or compound semiconductor wire or rod in the core. Another advantage is that maintaining a vacuum during fiber drawing removes gases and highly volatile impurities, such as water, from the inside of the tube, eliminating pores or voids in the resulting glass fiber.

The rod, wire or powder used can be of any metal, elemental semiconductor (such as Si and Ge), nonceramic semiconducting compound or ceramic used in the glass fiber art which has a melting temperature below the melting temperature of the glass. Preferred metals to be used according to the present invention include copper, gold, silver, platinum, rhodium, iron, nickel, or alloys based on these metals. Various different semiconductors, including ceramic semiconductors, may be used according to the present invention. The nonceramic semiconducting compounds include, but are not limited to, GaSb and InSb.

Any glass which can be drawn into a fiber and which has a working temperature above the melting temperature of the rod, wire or powder, may be used in the present invention. Appropriate glasses include, but are not limited to silicate-based glasses and fluoride-based glasses.

A number of advantages accrue from using a charge of powder as a source of the metal, elemental semiconductor or ceramic material in the core of the ultimately drawn glass fiber One advantage is that many materials can be prepared more easily in powder form than in the wire form needed in prior art processes. Another advantage is that different compositions can more easily be made by blending powders which will, when fused together, have a desired composition. Because of the support provided to the powder charge by the collapsed glass tube and frictional forces within the powder along the length of the charge, tubes can be nearly filled with powder before processing, and processing of long fiber lengths is simplified.

It has been found that the combination of a powder filling with a means to maintain a pressure gradient between the inside and outside of the tube makes possible the drawing of continuous glass fibers with metal, ceramic or elemental semiconductor cores.

FIG. 1a illustrates a longitudinal cross-sectional view of a glass tube shown generally at 1 having an outer wall 3, which is sealed at one end to an inner rod 5. Tube 1 can be evacuated through the other end 9 or a special opening (not shown) can be provided to evacuate the tube. Metal rod 5 can be introduced through the open end 9 after the tube is sealed. When a fiber 11 is drawn from this evacuated tube, it consists of a solid metal core surrounded by an outer layer of glass The lower end 7 of the tube is heated by heater 20 to a temperature sufficient to soften the glass to its working temperature and to melt the metal rod to form a pool of molten metal as shown at 13. Preferably, the closed end of the glass tube 1 is heated by a radiant heat source. In another preferred embodiment, the metal rod 5 within the closed end 1 of the glass tube 1 can be heated inductively. In such a case, the metal heats the adjacent glass At the same time, the other end of the tube is evacuated as at 10, creating a pressure gradient between the inside and outside of the tube sufficient to cause the softened closed end of the tube at 15 above the molten metal 13 to collapse onto contact with the solid metal rod 5. Preferably, the glass tube is evacuated to a pressure of from about 0.001 to 1.0 mm Hg. The collapsed portion of the softened glass tube prevents gaps from forming between the molten metal 13 and the end of the solid metal rod 5. A glass fiber 11 is then drawn from the heated closed end of the glass tube.

Figure 1B:
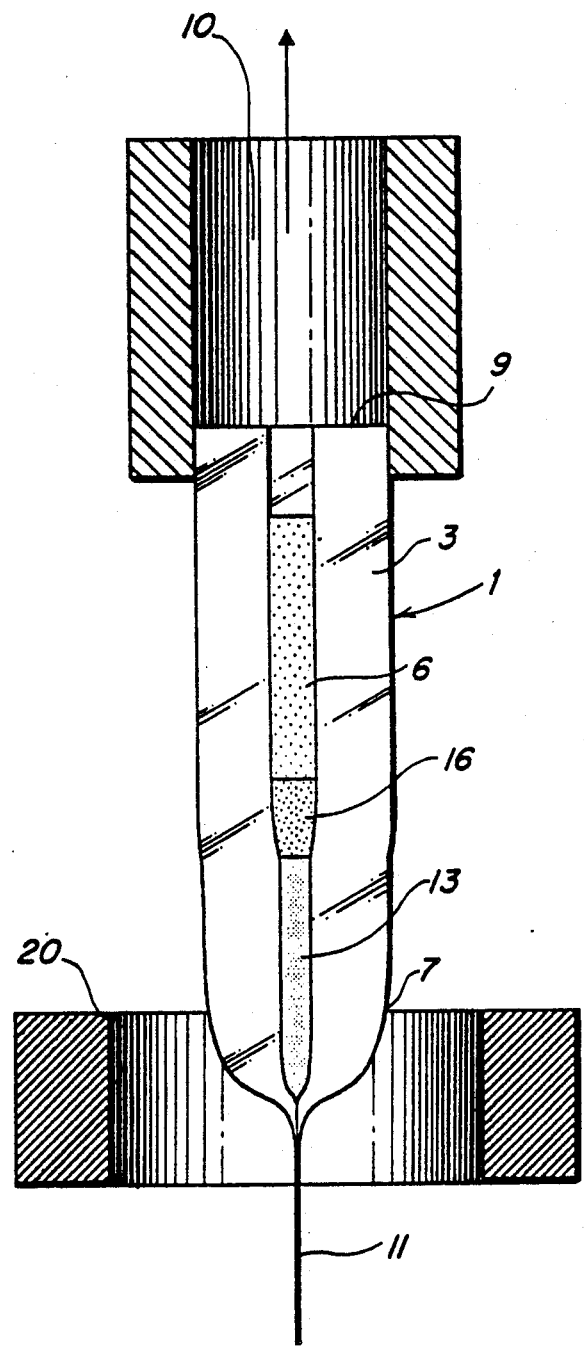
FIG. 1b is an enlarged view of a glass rod containing a powdered fill material from which a fiber is drawn at the lower heated end.

FIG. 1b shows a variation of the process described above, in which the glass tube 1 is filled with powder metal 6 or with a nonceramic semiconductor (elemental or compound) or ceramic (semiconducting or not) material in powder form. When such a powdered fill material is heated to near its melting temperature, the particles sinter together and occupy a smaller volume than the loose powder; and, when this occurs, the applied vacuum causes the heated and softened glass to shrink with the sintering powder, as is illustrated at 16. In all other respects, the process of drawing a fiber from a powder-filled tube is equivalent to drawing one from a tube with a solid fill of the type illustrated in FIG. 1.

In one aspect of the invention, it has been found that using the process of the present invention, it is possible to produce glass fibers from ten up to a few hundred micrometers in diameter, these fibers containing finer metal filamentary cores. According to the present invention, a method is provided for producing glass fibers with many metallic, ceramic or semiconductor filamentary cores as small as a one hundred nanometers in diameter, using only one drawing step. This can be accomplished by filling a glass tube with a mixture of finely powdered glass and powdered metal or semiconductor material. The glass powder can be of the same or different from the composition of the glass tube. The closed end of the glass tube can then be heated to the working temperature of the glass (which is above the melting point of the non-glass powder); and a glass fiber can be drawn from the heated end of the tube. At the same time, the tube is evacuated to remove gases and permit the formation of a glass fiber with minimal porosity.

Figure 2A:
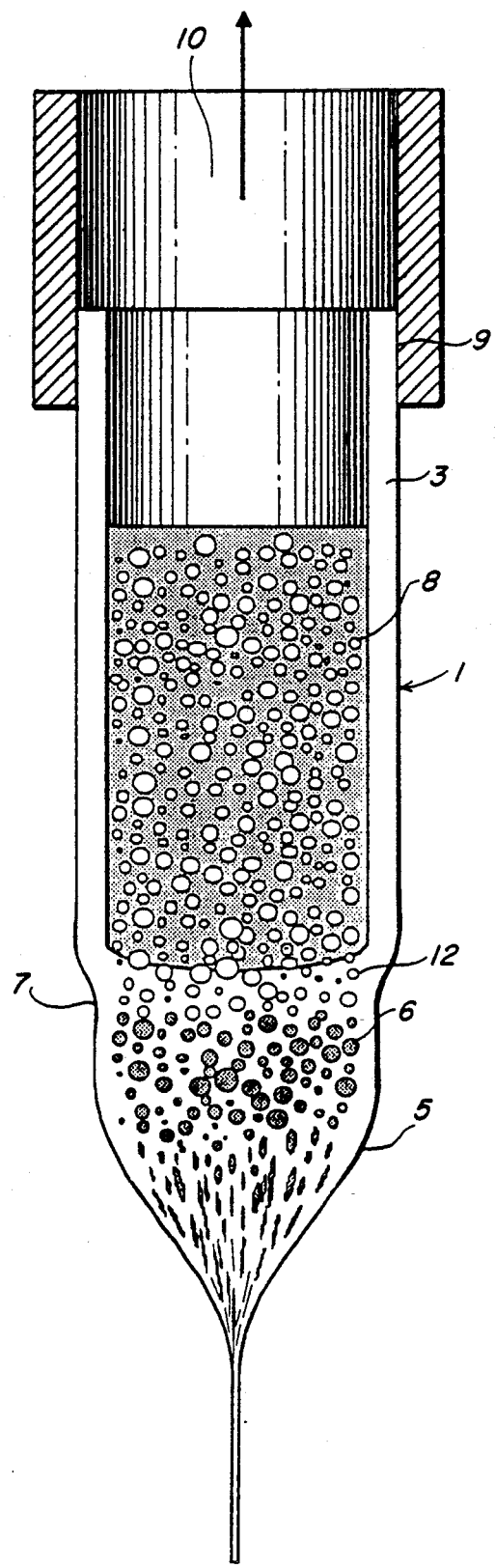
FIGS. 2(a) and 2(b) are sectional views of a glass tube containing a mixture of glass and metal particles, illustrating the drawing of a glass fiber containing a plurality of metal filaments in its core.
Figure 2B:
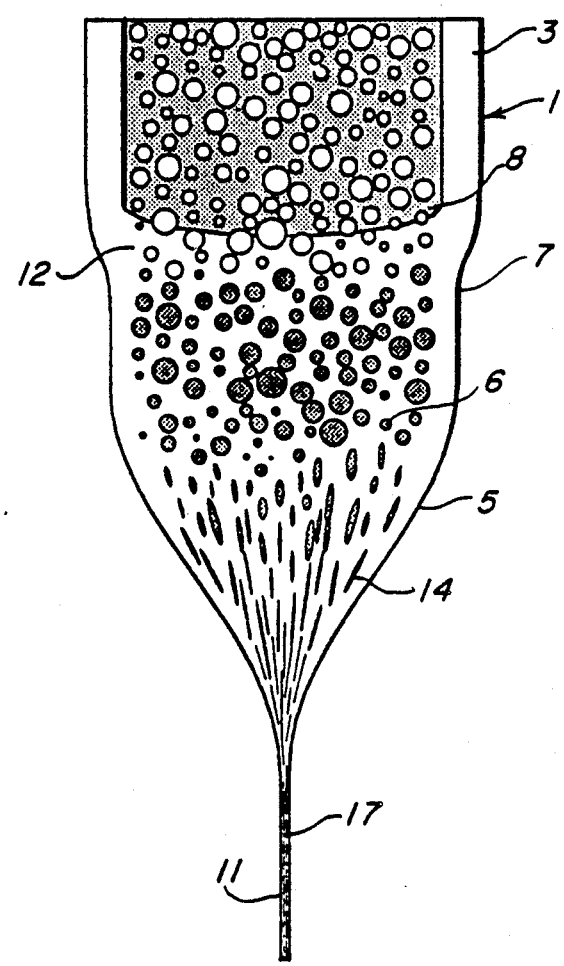

A powder-filled tube being drawn according to the present invention is illustrated schematically in FIGS. 2(a) and 2(b). It is preferred to use a metal powder having a diameter of no more than 150 $\mu$m. In a preferred embodiment, the fill within the tube comprises a mixture of glass powder and metal powder. In such cases, the metal powder preferably comprises from about 1-20 vol. % of the fill. The glass tube, indicated generally at 1, has a wall 3 and a closed end 5, which is heated during the drawing step. The other end 9 is connected to a vacuum source for reducing the pressure in the tube during drawing. A blend 8 of metal powder and pulverized glass is charged into tube 1. A glass fiber is drawn as the closed end of the tube which is heated to a temperature sufficient to melt the metal particles and soften the pulverized glass and the lower end of the glass tube. Preferably, the closed end of the glass tube 1 is heated sufficiently to melt a portion of the metal powder and soften the glass powder adjacent to the resultant molten metal. At a fixed rate of advancing the glass tube, pulling the glass fiber at higher speed, i.e., drawing rate, produces fibers of finer diameter, and the filaments contained within them are finer. The pressure differential between the inside and outside of the tube causes it to collapse onto the molten metal and softened glass charge 12 which shrink together as they are heated to the working temperature of the glass. This prevents gaps from forming between the wall of the glass tube 3 molten metal charge 6 and the softened glass charge 12.

As with other fiber drawing processes, the diameter of the glass fiber depends upon the speed at which the fiber is drawn, the diameter of the feedstock, and the speed at which the feedstock is advanced into the hot zone. In addition, the final diameter depends, in this new process, upon the filling fraction of the powders in the glass tube Because loose powders generally have 50% or more of open space between the particles, the fiber will be of a smaller diameter than if a solid glass rod were used. Different types of powders have different filling fractions, so there is no simple rule which can forecast the final diameter of all fibers Metal particles of spherical shape can have filling factors of 60% or a little higher, while very angular particles (such as crushed glass) may have filling factors as low as 20%. If a fiber is made from a 1 cm diameter tube having a 1 mm wall thickness, and if the powder fill is of such a nature that it collapses to 40% of its initial volume during the drawing process, then the fiber has only 51% of the cross sectional area of a fiber drawn from a solid rod with the same feed rate and pulling speed.

Figure 3A:
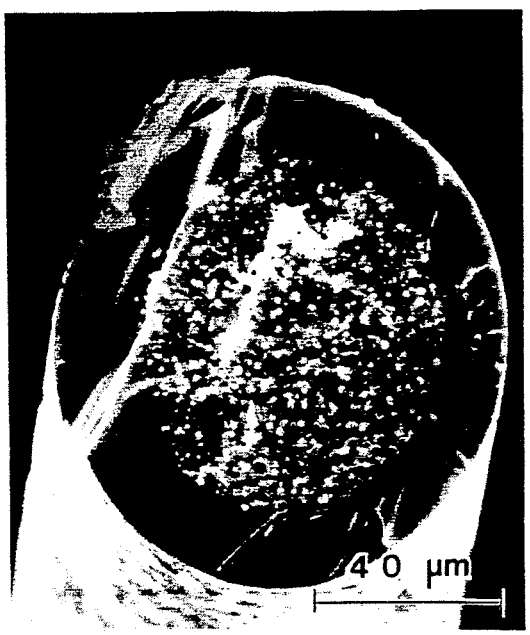
FIGS. 3(a) and 3(b) are photomicrographs of a glass fiber drawn according to the process shown in FIGS. 2(a) and 2(b), illustrating in FIG. 3(a) the end cross-section of such a glass fiber, and in FIG. 3(b) a cross-section of the core of the fiber.
Figure 3B:

FIG. 2(b) is an enlarged sectional view of the closed end of the tube illustrating the molten droplets 14 of either metal or a semiconducting material. It can be seen in FIG. 2(b) that as the tube is drawn, the molten metal droplets become elongated as at 17 and form discrete filaments in the resultant drawn glass fiber 11. Thus, the core of the resultant glass fiber contains many discrete filaments, as illustrated in the cross-sectional photomicrograph of such a fiber in FIG. 3(a), which shows a borosilicate glass fiber containing many germanium filaments. FIG. 3(b) is an enlarged photomicrograph of that same fiber cross-section showing the glass matrix surrounding and separating many of the discrete filaments in the core of the glass fiber. The micrographs also illustrate that the fiber contains some fine pores which are a result of the powdered glass not fully sintering.

The diameter of the filaments produced according to the process of the present invention depend on the size of the non-glass powder added to the glass tube and on the reduction ratio of the drawing operation If, for example, the non-glass powder particles have a diameter of 100 $\mu$m and the draw ratio is 200, then the filament will have a diameter of about 0.5 $\mu$m over much of its length and near its ends. It is preferred that the glass powder be comparable in size to the non-glass particles because this will aid in minimizing contact between the particles of non-glass material. Such contacts are generally undesirable because they can lead to agglomeration of the non-glass particles.

Figure 4:
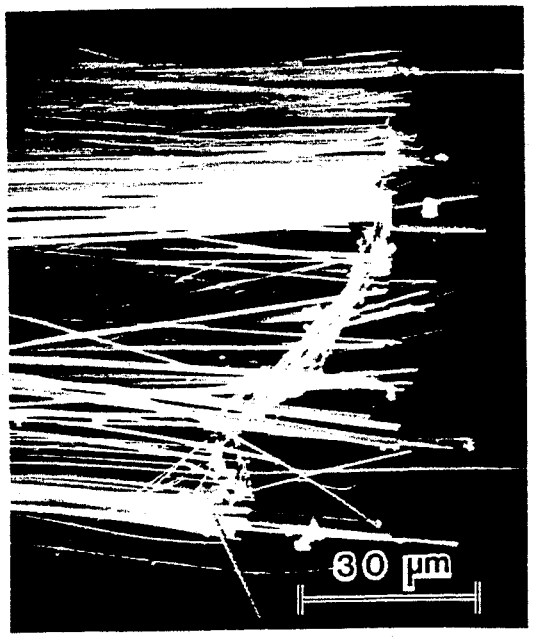
FIG. 4 is a photomicrograph of the end of the glass fibers shown in FIGS. 3(a) and 3(b) after the glass has been etched away to expose only the metal filaments.

The number of non-glass filaments within the cross-section of a glass fiber made according to the present invention depends on the number of powder particles within the glass tube. If only a few filaments are desired, e.g., from about 2 to 50, then only a small amount of non-glass powder is blended with the glass powder. If many are desired, then the proportion of non-glass particles is increased. For example, with powders which are less than 100 $\mu$m in diameter, it is possible to draw a glass fiber with hundreds of filaments at any cross-section. This is illustrated in FIG. 4, which shows an end portion of a bundle of germanium filaments drawn in a Pyrex fiber with all but the center core of the glass etched away. It has been found that metal and semiconducting materials in compatible glass can be drawn according to the present invention to produce glass fibers which are typically about 30-100 $\mu$m in diameter. These fibers typically contain filaments which can be about 0.1-5 $\mu$m in diameter and can, depending on the size of the metal particle, extend many centimeters in length. Fibers produced according to the present invention can be used in field-emitting arrays, electromagnetic suppression, electro-optical devices, and in superconducting wires. Glass fibers containing such filaments can be produced at moderate cost in kilometer lengths.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications and patents, cited above and below, are hereby incorporated by reference.

EXAMPLE 1

A 0.003-inch diameter Cu wire was inserted into a length of 9 mm outside diameter, 2.5 mm inside diameter capillary of Kimble glass type KG-33 (working point 1260° C.), which was sealed at one end. The capillary was fed at a speed of 0.08 mm/sec into an induction heated $Si_3N_4$ ring maintained at a temperature of approximately 1300° C. as a fiber was pulled from the lower end at a speed of 2.9 m/sec. The fiber so made was about 40 micrometers in diameter, but a Cu filament was present in only a portion of the fiber because when the wire melted, the melt broke down into a series of small spheres, thereby lowering its surface energy. The spheres were sequentially drawn into a series of filaments as the portion of the capillary they had occupied was drawn into the fiber.

EXAMPLE 2

A 0.003-inch diameter Cu wire was inserted into a length 2 mm outside diameter, 1.5 mm inside diameter glass tubing of GE type 180 (working point about 1370° C.), which was in turn contained within a length of 9 mm outside diameter, 2.5 mm inside diameter capillary of Kimble glass type KG-33 (working point 1260° C.), which was sealed at one end. The capillary was fed at a speed of 0.08 mm/sec into an induction heated $Si_3N_4$ ring maintained at a temperature of approximately 1300° C. as a fiber was pulled from the lower end at a speed of 2.9 m/sec. The fiber so made was about 40 micrometers in diameter and contained a Cu filament approximately 0.4 $\mu$m in diameter. At the processing temperature, the inner glass could not normally be drawn into a fiber because it would be too viscous. It was, however, hot enough to be collapsed by the force exerted on it by the outer glass and to be drawn out by it into a continuous sheath surrounding the metallic core. The high viscosity of this higher softening temperature glass core prevented the spheration of the molten Cu wire and caused it to be drawn out into a filament which was continuous before solidification. During solidification, short breaks were formed because of the shrinkage associated with freezing.

EXAMPLE 3

A length of 9 mm outside diameter, 2.5 mm inside diameter capillary of Kimble glass type KG-33 (working point 1260° C.) was sealed at one end, filled with a gas atomized Ni base alloy of AMS type 4777, evacuated by means of a mechanical vacuum pump, and fed at a speed of approximately 0.08 mm/sec into an induction-heated $Si_3N_4$ ring maintained at a temperature of approximately 1300° C. as a fiber was pulled from the lower end at a speed of 1.0 m/sec. The fiber so made was about 40 μm in diameter and contained a filament of the metal about 10 μm in diameter. The filament had intermittent breaks caused by shrinkage of the metal during solidification.

EXAMPLE 4

A length of 10 mm outside diameter, 8 mm inside diameter GE glass type 180 was filled with a mixture of about 10% by volume of AMS alloy type 4777 and 90% crushed type 180 glass, both screened to exclude particles larger than 63 μm. The tube was evacuated and advanced at a speed of 0.1 mm/sec into an induction-heated $Si_3N_4$ ring set at a temperature near 1400° C. as a fiber was pulled from the lower end at speeds ranging from approximately 0.5 up to 1.6 m/sec The fiber had diameters ranging from about 50 to 100 μm. The fiber contained numerous metallic filaments with as few as 10 filaments in some sections to perhaps as many as a hundred in other sections. The filaments were of different sizes, many having diameters in the range of 2 to 5 μm. These conditions show that the molten metal droplets were not reduced as much in diameter as was the tube.

EXAMPLE 5

A length of 6 mm outside diameter, 3 mm inside diameter capillary made of GE glass type 180 was filled with a mixture of about 10% by volume of AMS alloy type 4777 with particles in the size range of 90 to 106 μm and 90% crushed type 180 glass screened to exclude particles larger than 30 μm. The capillary was evacuated and advanced at 0.1 mm/sec into an induction-heated $Si_3N_4$ ring maintained at a range of temperatures near 1400° C. as a fiber was pulled from the lower end at approximately 1 m/sec. The fiber was of varying diameters and, in most portions of its length, contained only one or two coarse metal filaments. This example demonstrates that when the glass particles are substantially smaller than the metal particles, the glass particles are not able to generate the force necessary to deform the molten metal into a fine filament. This is so because they move about within the tub as it is drawn into a fiber, rather than retaining the fixed position relative to one another, which is required to draw out the metal.

EXAMPLE 6

A length of 10 mm outside diameter, 8 m inside diameter tube of Kimble glass type KG-33 was filled with a mixture consisting of 0.44 grams of crushed, high purity Ge and 0.94 grams of crushed type Kg-33 glass, both screened to exclude particles larger than 63 μm. The tube was evacuated and advanced at a speed of 0.1 mm/sec into an induction-heated $Si_3N_4$ ring maintained at a temperature of approximately 1400° C. as a fiber was pulled from the lower end at a speed of 1.25 m/sec. The fiber had a diameter of about 70μm. The fiber contained hundreds of Ge filaments at different positions along its length, these filaments varying in diameter from about 0.1 μm to 2.0 μm. The individual filaments were many mm in length and were not divided into shorter sections during solidification because Ge expands upon crystallizing.

EXAMPLE 7

Fragments of high purity germanium were inserted in a 6 mm outside diameter, 3 mm inside diameter type 180 glass capillary, which was evacuated and advanced at a speed of 0.1 mm/sec into an induction-heated $Si_3N_4$ ring maintained at a temperature of approximately 1400° C. as a fiber drawn by hand at a speed of about 2 cm/sec. The fiber was approximately 1 mm in diameter and contained a Ge core of varying diameters. Some portions of the Ge core were continuous over lengths of several centimeters. A portion of this thick fiber was inserted in a 9 mm outside diameter, 2.5 mm inside diameter capillary of Kimble glass type KG-33, which was sealed at one end. The capillary was fed at a speed of 0.08 mm/sec into an induction-heated $Si_3N_4$ ring maintained at a temperature of approximately 1300° C. as a fiber was pulled from the lower end at a speed of 1.25 m/sec. The fiber so made was about 40 micrometers in diameter, and it contained a Ge filament which had diameters ranging from about 1.0 to 6.0 μm and which was continuous over lengths of 10 or more cm. The process illustrated in this example has also been successfully used with the same glasses and with Bi, and should also be applicable to the production of glasses with cores of semiconducting compounds such as GaSb and InSb.

The preceding examples can be repeated with similar success by substituting the generically or specifically described reactants and/or operation conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process of forming a glass fiber with one or more metal filaments, elemental semiconductor filaments, nonceramic semiconducting compound filaments or ceramic filaments in its core, the process comprising:

heating a closed end of a first glass tube including a metal, elemental semiconductor, nonceramic semiconducting compound or ceramic powder in its core to the working temperature of the first glass tube, which is above the melting point of the metal, elemental semiconductor, nonceramic semiconducting compound or ceramic powder;

evacuating the first glass tube to create a pressure gradient between the inside and outside of the first glass tube sufficient to collapse the heated first glass tube into contact with the metal powder, elemental semiconductor powder, nonceramic semiconducting compound powder, or ceramic powder, respectively, thereby preventing the formation of a gap between the first glass tube and the metal, elemental semiconductor, nonceramic semiconducting compound or ceramic powder;

drawing a first glass fiber from the heated closed end of the first glass tube;

inserting said drawn first glass fiber into a second glass tube made of a glass with a lower working temperature than that of the initial fiber, said second tube having one sealed end to make a tube assembly;

evacuating said tube assembly; then drawing a second glass fiber from said tube assembly at a temperature above the working temperature of said second glass tube and below the working temperature of said first glass tube but sufficiently high for said drawing of said tube assembly that said first glass fiber is caused, by force exerted upon it by said second glass tube, to collapse and be drawn out into a continuous sheath surrounding said core.

2. The process of claim 1, wherein the first glass tube is evacuated to a pressure of from about 0.001 to 1.0 mm Hg.

3. The process of claim 1, wherein the closed end of the first glass tube is heated by a radiant heat source.

4. The process of claim 1, wherein the metal or semiconductor within the closed end of the first glass tube is heated inductively and the metal or semiconductor heats the adjacent glass.

5. The process of claim 1, wherein the wire or rod is copper, gold, silver, platinum, rhodium, iron, nickel, or alloys based on these metals.

6. The process of claim 1, wherein the wire or rod is germanium or silicon.

7. The process of claim 6, wherein the wire or rod is doped with an impurity to alter its electrical conductivity.

8. A process of forming a glass fiber with one or more metal filaments, elemental semiconductor filaments, nonceramic semiconducting compound filaments or ceramic filaments in its core, the process comprising:

heating a closed end of a glass tube having a fill comprising a first glass powder mixed with a second powder selected from the group consisting of a metal powder, an elemental semiconductor powder or a nonceramic semiconducting compound powder in its core to the working temperature of the glass tube, which is above the melting point of the second powder;

evacuating the glass tube to create a pressure gradient between the inside and outside of the glass tube sufficient to collapse the heated glass tube into contact with the fill, thereby preventing the formation of a gap between the tube and the fill; and drawing a glass fiber from the heated closed end of the glass tube.

9. The process of claim 8, wherein the powder is no more than about 150 $\mu$m in diameter.

10. The process of claim 1, wherein said powder is Ge, Bi, or a ceramic semiconducting compound or a nonceramic semiconducting compound.

11. The process of claim 10, wherein said powder is Ge, Be, GaSb or InSb.

12. The process of claim 1, wherein the closed end of the first glass tube is heated sufficiently to melt a portion of the metal, elemental semiconductor powder, nonceramic semiconducting compound powder or ceramic powder and sinter the powder adjacent the resultant molten metal powder, molten elemental semiconductor powder, nonceramic semiconducting compound powder or molten ceramic powder, respectively.

13. The process of claim 8, wherein the closed end of the glass tube is heated by a radiant heat source.

14. The process of claim 8, wherein the closed end of the glass tube is heated inductively.

15. The process of claim 10, wherein the powder is a ceramic semiconducting compound or a nonceramic semiconducting compound.

16. The process of claim 8, wherein the core of the glass tube includes a fill comprising glass powder mixed with a metal powder.

17. The process of claim 8, wherein the second powder comprises 1-20 vol. % of the fill.

18. The process of claim 16, wherein the metal powder is copper, gold, silver, iron, nickel, or alloys based on these metals.

19. The process of claim 8, wherein the second powder comprises germanium or silicon.

20. The process of claim 19, wherein the powder contains a dopant to alter the electrical conductivity of the filaments in the glass fiber.

21. The process of claim 1, wherein said first glass fiber includes a filament of a metal, elemental semiconductor or nonceramic semiconducting compound in its core.

22. The process of claim 21, wherein said filament is a Bi filament.

23. The process of claim 22, wherein said filament is a Ge filament.

24. The process of claim 17, wherein said second powder is a metal.

* * * * *